United States Patent
Barbuta et al.

(10) Patent No.: US 10,518,727 B1
(45) Date of Patent: Dec. 31, 2019

(54) STEP ASSEMBLY FOR ENERGY ABSORPTION

(71) Applicant: GM GLOBAL TECHNOLOGY OPERATIONS LLC, Detroit, MI (US)

(72) Inventors: Gheorghe Barbuta, Sterling Heights, MI (US); Shreeganesh Sudhindra, New Hudson, MI (US); Len V. Peschansky, West Bloomfield, MI (US); Jungryoung Kim, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/145,318

(22) Filed: Sep. 28, 2018

(51) Int. Cl.
  *B60R 3/00* (2006.01)
  *B60R 19/42* (2006.01)

(52) U.S. Cl.
  CPC .............. *B60R 19/42* (2013.01); *B60R 3/002* (2013.01)

(58) Field of Classification Search
  CPC .................................. B60R 3/00; B60R 3/002
  USPC ......................................................... 280/163
  See application file for complete search history.

(56) References Cited

U.S. PATENT DOCUMENTS

| | | | | |
|---|---|---|---|---|
| 4,203,611 A | * | 5/1980 | Makela | B60R 3/002 280/163 |
| 4,557,494 A | * | 12/1985 | Elwell | B60Q 1/323 24/514 |
| 4,951,986 A | * | 8/1990 | Hanafusa | B29C 49/4802 264/523 |
| 5,193,829 A | * | 3/1993 | Holloway | B60R 3/002 280/163 |
| 6,173,979 B1 | * | 1/2001 | Bernard | B60R 3/002 280/163 |
| 6,513,821 B1 | * | 2/2003 | Heil | B60R 3/002 182/228.2 |
| 6,688,621 B2 | * | 2/2004 | Benirschke | B60R 3/002 280/163 |
| 6,997,469 B2 | * | 2/2006 | Lanoue | B60R 3/002 280/163 |
| 7,168,721 B2 | * | 1/2007 | Mulder | B60R 3/00 280/163 |
| 7,213,826 B2 | * | 5/2007 | Chuba | B60R 3/002 280/163 |
| 7,311,320 B2 | * | 12/2007 | Kuntze | B60R 3/002 280/163 |
| 7,322,593 B2 | * | 1/2008 | Smith | B60R 3/002 280/163 |
| 7,334,807 B2 | * | 2/2008 | Mulder | B60R 3/002 280/163 |
| 7,413,205 B2 | * | 8/2008 | Watson | B60R 3/02 280/163 |

(Continued)

*Primary Examiner* — Jeffrey J Restifo
(74) *Attorney, Agent, or Firm* — Quinn IP Law

(57) ABSTRACT

An exemplary step assembly for a vehicle includes an energy absorption member including a support portion and a connection portion, the support portion including a support surface and a support structure, the support structure including a plurality of support members, the plurality of support members coupled to upper and lower inner walls of the support structure and a mounting member including a horizontal support member defining a plurality of openings. The energy absorption member is coupled to the mounting member with a mechanical fastener.

16 Claims, 2 Drawing Sheets

(56) References Cited

U.S. PATENT DOCUMENTS

| | | | | |
|---|---|---|---|---|
| 7,673,892 B2* | 3/2010 | Kuntze | ............... | B60R 3/002 280/163 |
| 7,740,261 B2* | 6/2010 | Leitner | ............... | B60R 3/02 280/163 |
| 8,016,309 B2* | 9/2011 | Flajnik | ............... | B60R 3/002 280/169 |
| 8,136,826 B2* | 3/2012 | Watson | ............... | B60R 3/02 280/163 |
| 8,668,217 B2* | 3/2014 | Ziaylek | ............... | B60R 3/02 280/163 |
| 8,727,364 B2* | 5/2014 | Masanek, Jr. | ............... | B60D 1/36 280/163 |
| 8,834,667 B2* | 9/2014 | McCarville | ............... | B29C 65/505 156/304.3 |
| 8,851,495 B1* | 10/2014 | Masanek, Jr. | ............... | B60R 3/00 280/163 |
| 9,145,035 B2* | 9/2015 | Masanek, Jr. | ............... | B60D 1/243 |
| 9,409,520 B1* | 8/2016 | Wang | ............... | F16B 5/126 |
| 9,499,221 B2* | 11/2016 | Deck | ............... | B60H 1/00564 |
| 9,598,004 B2* | 3/2017 | Yang | ............... | B60Q 1/323 |
| 9,598,019 B2* | 3/2017 | Lee | ............... | B62D 35/008 |
| 9,676,338 B2* | 6/2017 | Chapman | ............... | B60R 3/002 |
| 9,932,005 B2* | 4/2018 | Perucca | ............... | B60R 19/18 |
| 9,937,865 B1* | 4/2018 | Oakey | ............... | B60R 3/002 |
| 9,944,230 B2* | 4/2018 | Campbell | ............... | B60R 3/002 |
| 2005/0067741 A1* | 3/2005 | Chapman | ............... | B29C 49/20 264/516 |
| 2007/0296175 A1* | 12/2007 | Flajnik | ............... | B60R 3/002 280/169 |

* cited by examiner

STEP ASSEMBLY FOR ENERGY ABSORPTION

INTRODUCTION

The present invention relates generally to the field of vehicles and, more specifically, to vehicle structures and, more particularly, to means for enhancing the side impact performance of a vehicle.

Vehicle manufacturers use a variety of structures and components to protect a vehicle's occupants and vehicle components during a side impact collision. Additionally, some vehicle manufacturers have provided steps on either side of the passenger compartment to aid riders stepping into and alighting from the motor vehicle. Accordingly, what is needed is an assembly that provides superior side impact collision protection, while also acting as an assist step.

SUMMARY

Embodiments according to the present disclosure provide a number of advantages. For example, embodiments according to the present disclosure reduce passenger-compartment intrusion and damage to chassis-mounted components such as vehicle batteries due to side impact collisions and also act as an assist step to allow a vehicle passenger easier ingress and egress to the vehicle's passenger compartment.

In one aspect, a step assembly for a vehicle includes an energy absorption member including a support portion and a connection portion, the support portion including a support surface and a support structure, the support structure including a plurality of support members, the plurality of support members coupled to upper and lower inner walls of the support structure and a mounting member including a horizontal support member defining a plurality of openings. The energy absorption member is coupled to the mounting member with a fastening member.

In some aspects, the plurality of support members form an interior truss structure.

In some aspects, the support structure of the support portion further includes a lower surface defining a support structure opening.

In some aspects, the connection portion has a rectangular cross-section and extends inward of the support portion toward the vehicle.

In some aspects, the support portion includes a first wall, an interior wall, and a second wall, an exterior of the first wall defines the support surface and the plurality of support members form a truss structure extending a length of the step assembly, the truss structure extending between an interior surface of the first wall and an upper surface of the interior wall.

In some aspects, the interior wall and the second wall define an opening that extends the length of the step assembly below the truss structure.

In some aspects, the mounting member includes a first passage and the energy absorption member includes a second passage, and the first and second passages are aligned to form a continuous passage configured to receive the fastening member.

In another aspect, an automotive vehicle includes a frame member, a body structure coupled to the frame member, a step assembly coupled to the frame member, the step assembly including an energy absorption member and a mounting member, the energy absorption member including a support portion and a connection portion, the support portion including a support surface and a support structure, the support structure including a plurality of support members, the plurality of support members coupled to upper and lower inner walls of the support structure such that the plurality of support members form a V-shaped truss structure.

In some aspects, the support structure of the support portion further includes a lower surface defining a support structure opening.

In some aspects, the connection portion has a rectangular cross-section and extends inward of the support portion toward the vehicle.

In some aspects, the support portion includes a first wall, an interior wall, and a second wall, an exterior of the first wall defines the support surface and the truss structure extends a length of the step assembly, the truss structure extending between an interior surface of the first wall and an upper surface of the interior wall.

In some aspects, the interior wall and the second wall define an opening that extends the length of the step assembly below the truss structure.

In some aspects, the mounting member includes a first passage and the energy absorption member includes a second passage, and the first and second passages are aligned to form a continuous passage configured to receive a fastening member.

In yet another aspect, a system for absorbing a side impact load on a vehicle includes a step assembly including an energy absorption member and a mounting member, the energy absorption member including a support portion and a connection portion, the support portion including a support surface and a support structure, the support structure including a plurality of support members, the plurality of support members coupled to upper and lower inner walls of the support structure such that the plurality of support members form a V-shaped truss structure.

In some aspects, the support structure of the support portion further includes a lower surface defining a support structure opening.

In some aspects, the connection portion has a rectangular cross-section and extends inward of the support portion toward the vehicle.

In some aspects, the support portion includes a first wall, an interior wall, and a second wall, an exterior of the first wall defines the support surface and the truss structure extends a length of the step assembly, the truss structure extending between an interior surface of the first wall and an upper surface of the interior wall.

In some aspects, the interior wall and the second wall define an opening that extends the length of the step assembly below the truss structure.

In some aspects, the mounting member includes a first passage and the energy absorption member includes a second passage, and the first and second passages are aligned to form a continuous passage configured to receive a fastening member.

BRIEF DESCRIPTION OF THE DRAWINGS

The present disclosure will be described in conjunction with the following figures, wherein like numerals denote like elements.

Figure 1:
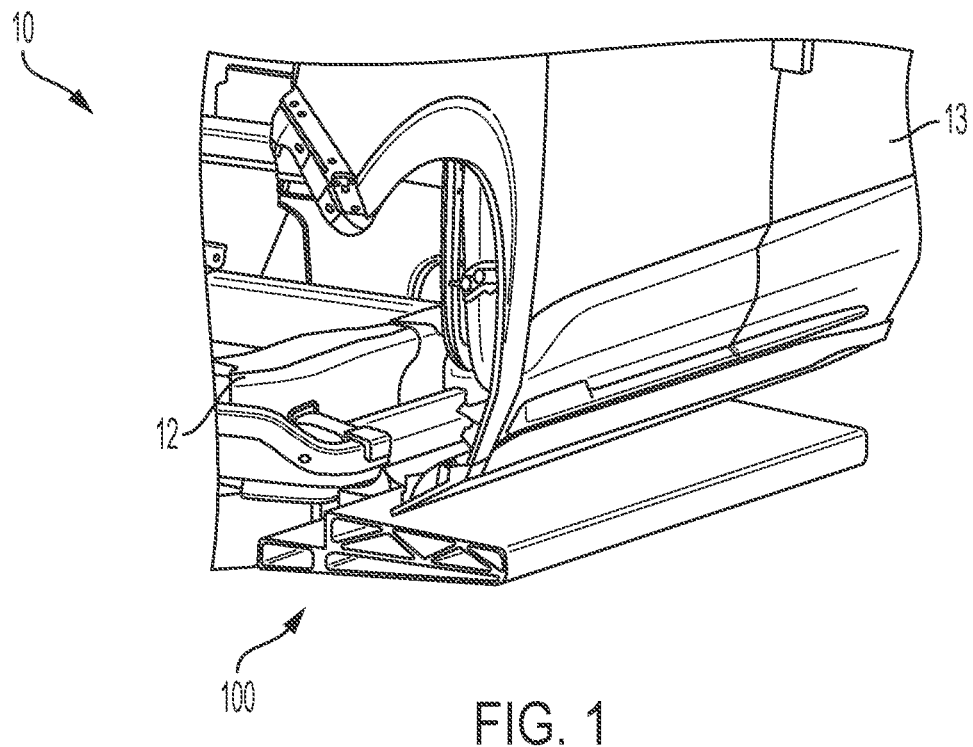
FIG. 1 is a partial side perspective view of a vehicle including a side impact absorption system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

A step assembly for a vehicle, one embodiment of which is described herein, includes an energy absorption member and a mounting member. In some embodiments, the step assembly is coupled to the vehicle frame of a body-on-frame vehicle. In some embodiments, the body-on-frame vehicle is an electric vehicle having a battery compartment extending along a length of the vehicle. When coupled to the vehicle, the step assembly provides protection from passenger compartment intrusion and/or damage to vehicle components such as the electric vehicle batteries due to a side impact event as well as improving vehicle ingress and egress for vehicle passengers.

FIG. 1 illustrates a vehicle 10 having a step assembly 100 as discussed herein. The vehicle 10 is, in some embodiments, a body-on-frame (BOF) vehicle having a body 13 coupled to a vehicle frame 12. The step assembly 100 provides a support surface for passenger egress and ingress to the vehicle 10 as well as providing impact protection, particularly from side impact events, for the passenger compartment and frame-mounted components.

Figure 2:
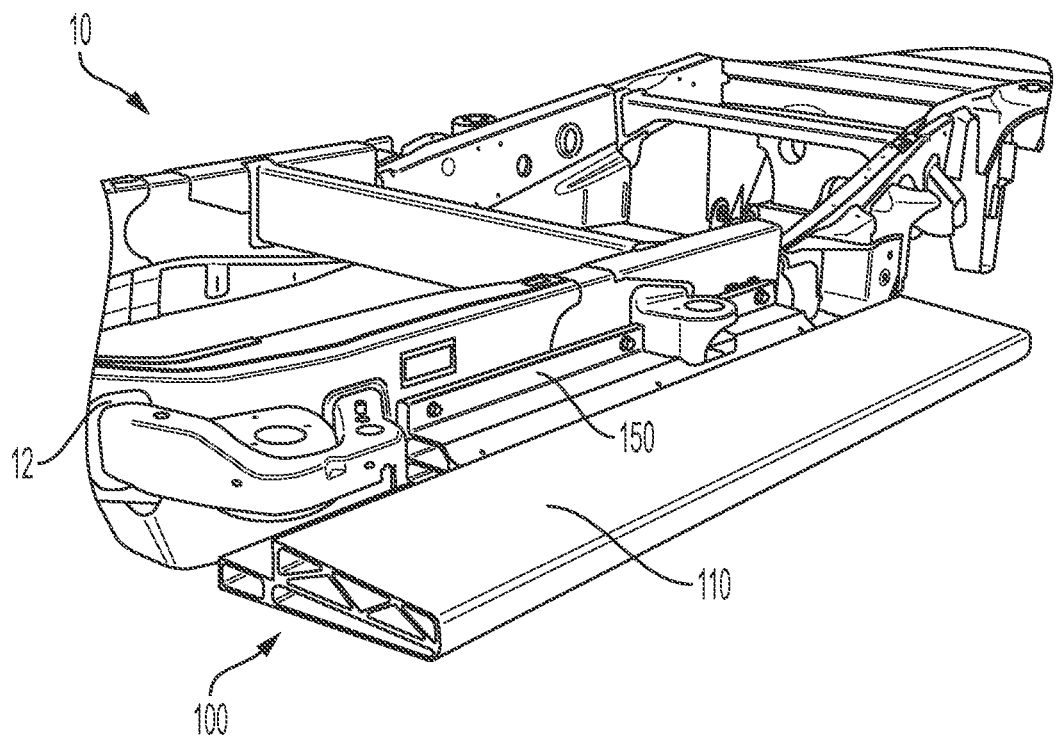
FIG. 2 is another partial side perspective of a vehicle including a side impact absorption system, according to an embodiment.

FIG. 2 illustrates the vehicle 10 with the body 13 removed. The step assembly 100 includes an energy absorption member 110 and a mounting member 150. The energy absorption member 110 includes a support surface that is used as a step to allow the passenger easier ingress to and egress from the passenger compartment of the vehicle 10.

In some embodiments, as shown in FIG. 2, the step assembly 100 is a continuous structure that extends along the length of the vehicle 10 from a first end of the vehicle frame member 12 to a second end of the vehicle frame member 12 opposite the first end. In some embodiments, the mounting member 150 is coupled to the frame member 12 at multiple points along the length of the frame member 12. In some embodiments, the mounting member 150 is discontinuous, that is, multiple mounting members 150 are used to couple the step assembly 110 to the vehicle 10.

Figure 3:
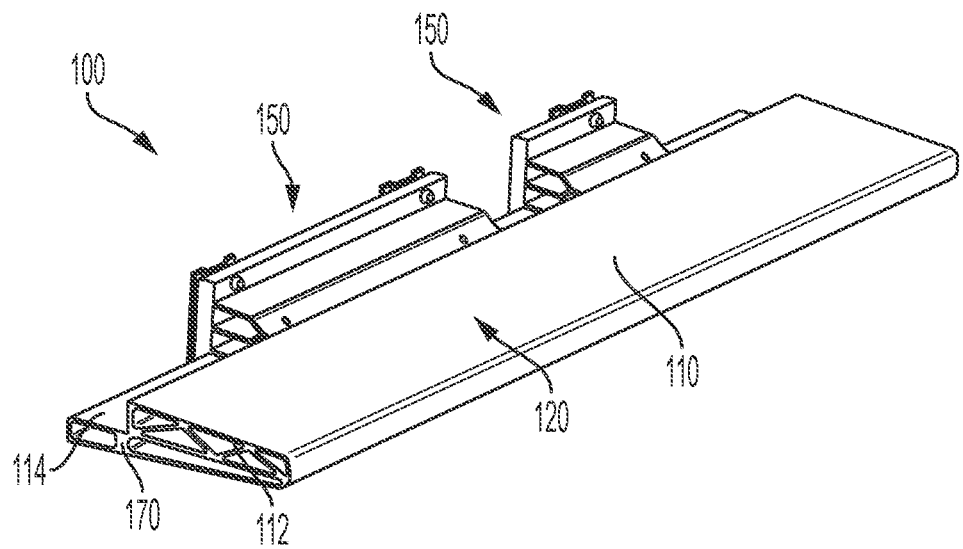
FIG. 3 is a perspective view of the side impact absorption system shown in FIGS. 1 and 2.
Figure 4:
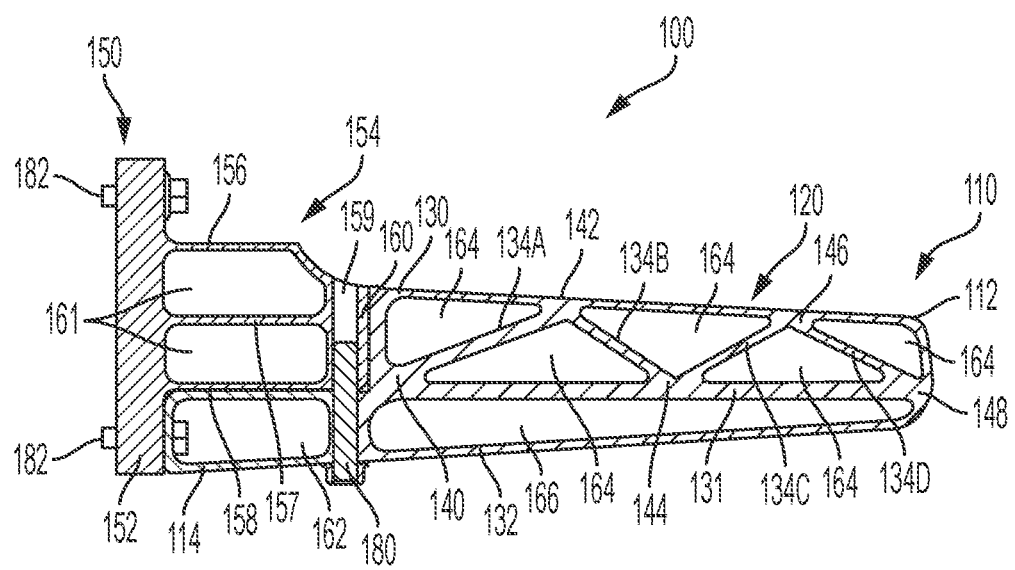
FIG. 4 is a cross-sectional view of the side impact absorption system of FIG. 3, according to an embodiment.

With reference now to FIGS. 3 and 4, the step assembly 100 is shown in greater detail. The step assembly 100 includes the energy absorption member 110 and the mounting member or members 150. The energy absorption member 110 includes a support portion 112 and a connection portion 114. The connection portion 114 has a rectangular cross-section and extends inward of the support portion 112 toward the vehicle 10.

The support portion 112 includes a first wall 130, an interior wall 131, and a second wall 132. An exterior surface of the first wall 130 defines a support surface 120. The support portion 112 also includes a support structure including a plurality of support members 134A-D. The plurality of support members 134A-D extend between the interior surface of the first wall 130 and an upper surface of the interior wall 131.

With further reference to FIG. 4, in some embodiments, the plurality of support members 134A-D form an interior truss structure to provide mechanical and structural rigidity to the step assembly. In some embodiments, a first end of the first support member 134A is coupled to the upper surface of the interior wall 131 at a first connection point 140. A second end of the first support member 134A opposite the first end and a first end of the second support member 134B are coupled to the interior surface of the first wall 130 at a second connection point 142. A second end of the second support member 134B opposite the first end and a first end of the third support member 134C are coupled to the upper surface of the interior wall 131 at a third connection point 144. A second end of the third support member 134C opposite the first end and a first end of the fourth support member 134D are coupled to the interior surface of the first wall 130 at a fourth connection point 146. A second end of the fourth support member 134D opposite the first end is coupled to the upper surface of the interior wall 131 at a fifth connection point 148. The orientation and position of the support members 134A-D form an alternating "V"-shaped interior truss structure that includes a plurality of triangular open spaces 164. While a "V"-shaped truss structure is shown in FIGS. 2-4, it can be appreciated that the step assembly 100 can include any truss structure formed by the orientation and position of the support members, such as, for example and without limitation, an "X"-shaped truss structure.

The first wall 130 curves to join the second wall 132 at the fifth connection point 148 outboard of the vehicle 10 to enclose the truss structure formed by the plurality of support members 134A-D. Preferably, the truss structure extends the entire length of the step assembly 100 to provide structural rigidity and impact protection along the length of the frame member 12.

The truss structure formed by the plurality of support members between the interior surface of the first wall 130 and the upper surface of the interior wall 131 reduces the weight of the step assembly 100 while maintaining the structural rigidity and allowing the step assembly 100 to absorb the energy imparted by a side impact event through deformation.

The interior wall 131 and the second wall 132 define an opening 166. The opening 166 extends the length of the step assembly 100 below or underneath the truss structure. The opening 166 reduces the weight of the step assembly 100 and also allows the step assembly to deform to absorb the energy of a side impact event.

The energy absorption member 110 further includes a connection portion 114, as best shown in FIGS. 3 and 4. The connection portion 114 extends inward of the support portion 112. The connection portion 114 includes a wall 115 that defines a rectangular opening 162. The opening 162 is separated from the opening 166 of the support portion 112 by a vertical wall 170, shown in FIG. 3.

With continued reference to FIG. 4, the step assembly 100 also includes at least one mounting member 150. The mounting member 150 includes a vertical connection member 152 and a plurality of horizontal support members 156, 157, 158. The plurality of horizontal support members 156, 157, 158 are approximately parallel and define a plurality of chambers 161. The mounting member 150 also includes a vertical wall 160.

A passage 159 passes through the vertical wall 160 of the mounting member and the vertical wall 170 of the energy absorption member 110. Preferably, the vertical wall 160 of the mounting member 150 is vertically and horizontally aligned with the vertical wall 170 of the connection portion 114 such that the passage 159 is a continuous passage configured to receive a fastening member 180, which may be any type of mechanical fastener such as a bolt, for example and without limitation. The fastening member 180 passes through at least a portion of each of the vertical wall 160 and the vertical wall 170 to couple together the mounting member 150 and the energy absorption member 110.

In some embodiments, the fastening member 180 is inserted into the passage 159 from the underside of the step assembly 100 and passes through the entirety of the passage 159 contained within the wall 170 and at least partially into the portion of the passage 159 contained within the wall 160, as shown in FIG. 4. In other embodiments, the fastening member 180 is inserted from the topside of the step assembly 100. When the energy absorption member 110 and the mounting member 150 are vertically aligned and coupled together, the openings 161 of the mounting member 150 are vertically aligned with the opening 162 of the connection portion 114.

As shown in FIG. 4, a plurality of fastening members 182 couple the mounting member 150 to the frame member 12. The fastening members 182 pass through the vertical connection member 152 and through at least a portion of the frame member 12. In some embodiments, one of the fastening members 182 also passes through the portion of the wall 115 of the connection portion 114 that is vertically adjacent to the vertical connection member 152. The fastening members 182 may be any type of mechanical fastener, such as bolts, screws, or rivets, for example and without limitation. In some embodiments, the fastening members 182 are vertically aligned to couple the step assembly 100 to the frame member 12 such that the support surface 120 of the energy absorption member 110 is approximately horizontal, providing a step surface for vehicle ingress and egress.

The step assembly 100 performs as an impact beam to distribute crash forces/loads of a side impact event over the surface area of the energy absorption member 110 to minimize intrusion into the passenger compartment and damage to frame-mounted components such as, for example and without limitation, high voltage electrical components, rechargeable energy storage system components such as batteries, fuel cell stacks, and hydrogen and compressed natural gas (CNG) tanks.

Additionally, the configuration and position of the one or more mounting members 150 accommodate multiple connection points with the frame member 12 as well as allowing space for body mounts positioned between the frame member 12 and the step assembly 100.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A step assembly for a vehicle, comprising:
   an energy absorption member comprising a support portion and a connection portion, the support portion comprising a support surface and a support structure, the support structure comprising a plurality of support members, the plurality of support members coupled to upper and lower inner walls of the support structure; and
   a mounting member comprising a horizontal support member defining a plurality of openings;
   wherein the energy absorption member is coupled to the mounting member with a fastening member; and
   wherein the mounting member comprises a first passage and the energy absorption member comprises a second passage, and the first and second passages are aligned to form a continuous passage configured to receive the fastening member.

2. The step assembly of claim 1, wherein the plurality of support members form an interior truss structure.

3. The step assembly of claim 1, wherein the support structure of the support portion further comprises a lower surface defining a support structure opening.

4. The step assembly of claim 1, wherein the connection portion has a rectangular cross-section and extends inward of the support portion toward the vehicle.

5. The step assembly of claim 1, wherein the support portion includes a first wall, an interior wall, and a second wall, an exterior of the first wall defines the support surface and the plurality of support members form a truss structure extending a length of the step assembly, the truss structure extending between an interior surface of the first wall and an upper surface of the interior wall.

6. The step assembly of claim 5, wherein the interior wall and the second wall define an opening that extends the length of the step assembly below the truss structure.

7. An automotive vehicle, comprising:
   a frame member;
   a body structure coupled to the frame member; and
   a step assembly coupled to the frame member, the step assembly comprising an energy absorption member and a mounting member, the energy absorption member comprising a support portion and a connection portion, the support portion comprising a support surface and a support structure, the support structure comprising a plurality of support members, the plurality of support members coupled to upper and lower inner walls of the support structure such that the plurality of support members form a V-shaped truss structure;
   wherein the support portion includes a first wall, an interior wall, and a second wall, an exterior of the first wall defines the support surface and the truss structure extends a length of the step assembly, the truss structure extending between an interior surface of the first wall and an upper surface of the interior wall.

8. The automotive vehicle of claim 7, wherein the support structure of the support portion further comprises a lower surface defining a support structure opening.

9. The automotive vehicle of claim 7, wherein the connection portion has a rectangular cross-section and extends inward of the support portion toward the vehicle.

10. The automotive vehicle of claim 7, wherein the interior wall and the second wall define an opening that extends the length of the step assembly below the truss structure.

11. The automotive vehicle of claim 7, wherein the mounting member comprises a first passage and the energy absorption member comprises a second passage, and the first and second passages are aligned to form a continuous passage configured to receive a fastening member.

12. A system for absorbing a side impact load on a vehicle, the system comprising:

a step assembly comprising an energy absorption member and a mounting member, the energy absorption member comprising a support portion and a connection portion, the support portion comprising a support surface and a support structure, the support structure comprising a plurality of support members, the plurality of support members coupled to upper and lower inner walls of the support structure such that the plurality of support members form a V-shaped truss structure;

wherein the mounting member comprises a first passage and the energy absorption member comprises a second passage, and the first and second passages are aligned to form a continuous passage configured to receive a fastening member.

13. The system of claim 12, wherein the support structure of the support portion further comprises a lower surface defining a support structure opening.

14. The system of claim 12, wherein the connection portion has a rectangular cross-section and extends inward of the support portion toward the vehicle.

15. The system of claim 12, wherein the support portion includes a first wall, an interior wall, and a second wall, an exterior of the first wall defines the support surface and the truss structure extends a length of the step assembly, the truss structure extending between an interior surface of the first wall and an upper surface of the interior wall.

16. The system of claim 15, wherein the interior wall and the second wall define an opening that extends the length of the step assembly below the truss structure.

* * * * *